(12) United States Patent
Wilkie et al.

(10) Patent No.: US 8,528,962 B2
(45) Date of Patent: Sep. 10, 2013

(54) MOBILE HOME WITH AN INTEGRATED DECK

(76) Inventors: Matthew Bevan Wilkie, Christchurch (NZ); Stuart Michael Winterbourn, Christchurch (NZ)

( * ) Notice: Subject to any disclaimer, the term of this patent is extended or adjusted under 35 U.S.C. 154(b) by 0 days.

(21) Appl. No.: 13/811,968

(22) PCT Filed: Aug. 5, 2011

(86) PCT No.: PCT/NZ2011/000152
§ 371 (c)(1),
(2), (4) Date: Jan. 24, 2013

(87) PCT Pub. No.: WO2012/018267
PCT Pub. Date: Feb. 9, 2012

(65) Prior Publication Data
US 2013/0119699 A1 May 16, 2013

(30) Foreign Application Priority Data
Aug. 6, 2010 (NZ) ........................................ 587254

(51) Int. Cl.
*B60P 3/37* (2006.01)
*B60P 3/34* (2006.01)
*B60P 3/35* (2006.01)

(52) U.S. Cl.
USPC ................... 296/162; 296/26.03; 296/26.14; 296/163; 296/172; 296/176

(58) Field of Classification Search
CPC ................. B60P 3/34; B60P 3/35; B60P 3/37
USPC ............ 52/65, 79.5, 79.6; 296/26.03, 26.08, 296/26.09, 26.1, 26.11, 26.12, 26.13, 26.14, 296/156, 162, 163, 168, 172, 175, 176
See application file for complete search history.

(56) References Cited

U.S. PATENT DOCUMENTS

| | | | | |
|---|---|---|---|---|
| 1,965,451 A | * | 7/1934 | Brown | ........................ 296/26.15 |
| 2,132,409 A | * | 10/1938 | Gedeon | .......................... 296/172 |
| 2,457,581 A | * | 12/1948 | McCain | ........................ 296/171 |
| 2,552,691 A | * | 5/1951 | Saunders-Knox-Gor | ......... 52/67 |
| 3,106,750 A | * | 10/1963 | Jarman | .............................. 52/67 |

(Continued)

FOREIGN PATENT DOCUMENTS

DE 4100301 A1 * 7/1992
DE 4423173 A1 * 5/1995

(Continued)

OTHER PUBLICATIONS

International Search Report for PCT/NZ2011/000152, mailing date of Dec. 6, 2011.

(Continued)

*Primary Examiner* — Glenn Dayoan
*Assistant Examiner* — Paul Chenevert
(74) *Attorney, Agent, or Firm* — Westerman, Hattori, Daniels & Adrian, LLP

(57) ABSTRACT

Described herein is a mobile home 1 being a caravan, recreational vehicle or the like that includes an outdoor deck section 3 that pivots from the main structure 2. When in an open configuration, the deck 3 is available for use and, when being moved, the deck portion 3 is moved to integrate with the main structure 2.

30 Claims, 7 Drawing Sheets

(56) References Cited

U.S. PATENT DOCUMENTS

| | | | |
|---|---|---|---|
| 3,226,890 A * | 1/1966 | Flajole | 52/66 |
| 3,495,865 A * | 2/1970 | Hill | 296/22 |
| 3,614,152 A * | 10/1971 | Hancock | 296/103 |
| 3,655,236 A * | 4/1972 | Hair | 296/176 |
| 3,692,351 A * | 9/1972 | Christopher et al. | 296/156 |
| 3,737,191 A * | 6/1973 | Fackre | 296/26.15 |
| 3,740,088 A * | 6/1973 | Ratcliff | 296/171 |
| 3,959,936 A * | 6/1976 | Lambooy | 52/65 |
| 3,997,211 A | 12/1976 | Graves | |
| 4,114,942 A | 9/1978 | Greiner | |
| 4,261,613 A * | 4/1981 | Alford | 296/156 |
| 5,094,048 A * | 3/1992 | Woo | 52/143 |
| 5,193,878 A * | 3/1993 | Weaver | 296/162 |
| 5,417,468 A | 5/1995 | Baumgartner et al. | |
| 5,706,616 A * | 1/1998 | Fernandez | 52/143 |
| 5,951,082 A * | 9/1999 | DiBiagio et al. | 296/26.13 |
| 6,705,051 B1 * | 3/2004 | Wall | 52/66 |
| 6,779,833 B2 | 8/2004 | Benz et al. | |
| 6,817,642 B1 * | 11/2004 | Warning | 296/1.07 |
| 7,093,888 B2 * | 8/2006 | Anderson et al. | 296/162 |
| 7,267,392 B1 * | 9/2007 | Rounds | 296/168 |
| 7,267,393 B2 | 9/2007 | Booher | |
| 7,410,205 B2 | 8/2008 | Cardwell et al. | |
| 7,681,941 B2 * | 3/2010 | Freeman et al. | 296/168 |
| 8,191,564 B1 * | 6/2012 | Lindholm | 135/96 |
| 2005/0235819 A1 * | 10/2005 | Long | 89/36.07 |
| 2006/0158004 A1 * | 7/2006 | Harris et al. | 296/176 |
| 2011/0047891 A1 * | 3/2011 | Andretich | 52/79.5 |
| 2011/0209418 A1 * | 9/2011 | Drake | 52/79.5 |
| 2012/0159870 A1 * | 6/2012 | Pulver | 52/65 |
| 2012/0317897 A1 * | 12/2012 | Way | 52/65 |

FOREIGN PATENT DOCUMENTS

| | | | |
|---|---|---|---|
| EP | 11041 A1 * | 5/1980 | |
| EP | 1314607 A1 * | 5/2003 | |
| FR | 2616116 A1 * | 12/1988 | |
| GB | 590345 A | 7/1947 | |
| GB | 2191738 A * | 12/1987 | |
| GB | 2411155 A * | 8/2005 | |
| GB | 2 451 694 A | 2/2009 | |
| JP | 10181420 A * | 7/1998 | |
| NZ | 224828 | 9/1990 | |
| WO | WO 9630229 A1 * | 10/1996 | |
| WO | 2004/065167 A1 | 8/2004 | |

OTHER PUBLICATIONS

Written Opinion of the International Searching Authority for PCT/NZ2011/000152, mailing date of Dec. 6, 2011.

Written Opinion of the International Preliminary Examining Authority for PCT/NZ2011/000152, mailing date of Jul. 2, 2012.

International Preliminary Report on Patentability for PCT/NZ2011/000152, mailing date of Sep. 6, 2012.

* cited by examiner

MOBILE HOME WITH AN INTEGRATED DECK

RELATED APPLICATIONS

This application derives priority from the provisional specification allocated the application number NZ587254, the contents of which are incorporated herein by reference.

TECHNICAL FIELD

The application relates to a mobile home. More specifically, the application relates to a mobile home with an integrated deck.

BACKGROUND ART

Caravans, motor homes, recreational vehicles and the like are well known in the art essentially being mobile living environments that are either towed by a vehicle or self powered, for example where the living environment is mounted on a truck chassis. For the purposes of this specification, the term mobile home will be used in reference to all types of mobile living environments including caravans, RV's and the like.

Existing art designs largely follow a similar design essentially being a single fixed exterior shape.

One variation to extend the living space is the use of a temporary shelter area extending from the fixed structure such as an awning. While the awning provides a degree of shelter, the floor is typically the natural ground surface or a barrier cloth such as a tarpaulin.

Some art designs such as GB2451694 include sections of the fixed structure that may pivot about an axis thereby extending the living space during use and then the extending structure pivots back into the main structure when transported. While this design provides greater internal area, it is still limited in that the external area of the fixed structure remains the same (or even reduced as the pivoting extension takes up space typically where the awning extends from). The extending fixed structure does not provide a deck surface for a fixed structure outdoor living area.

It should be appreciated that an extended outdoor living area integral to the mobile living environment is desired as exemplified by use of awnings and similar structures. Providing a semi-fixed structure extending from the mobile living environment is however preferable as it is potentially more durable and weather proof and easier to set up and pack down.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description that is given by way of example only.

SUMMARY

The application broadly relates to a modified mobile living environment that incorporates a moulded skin that in transport, matches the enclosed part of the mobile environment and in use slides and rotates away form the enclosed part of the mobile environment to form a deck area.

For the purposes of this specification, the term 'mobile home' incorporates caravans, mobile homes, recreational vehicles (RV's) and the like be they towed or self propelled.

In a first aspect there is provided a mobile home comprising an internal structure housing the inside living area of the mobile home and an external structure that surrounds at least part of the internal structure and wherein the mobile home has two configurations being:
  (a) a closed configuration wherein the external structure substantially aligns with and encloses at least part of the internal structure; and
  (b) an open configuration wherein the internal structure rotates from the external structure forming an outdoor deck area on the external structure adjacent the internal structure inside living area.

In a second aspect there is provided a mobile home comprising an internal structure housing the inside living area of the mobile home and an external structure that surrounds at least part of the internal structure and wherein the mobile home has two configurations being:
  (a) a closed configuration wherein the external structure substantially aligns with and encloses at least part of the internal structure; and
  (b) an open configuration wherein the external structure rotates from the internal structure forming an outdoor deck area on the external structure adjacent the internal structure inside living area.

As should become apparent from the description below, the interaction between inside and outside of the mobile home of the design differs considerably when compared to art mobile homes. The mobile home described herein provides the option of a fixed structure deck area that may be quickly set up and broken down. By integrating a cooking area in the external structure, the internal structure has additional space compared to existing designs.

BRIEF DESCRIPTION OF THE DRAWINGS

Further aspects of the mobile home will become apparent from the following description that is given by way of example only and with reference to the accompanying drawings in which.

DETAILED DESCRIPTION

Figure 1:
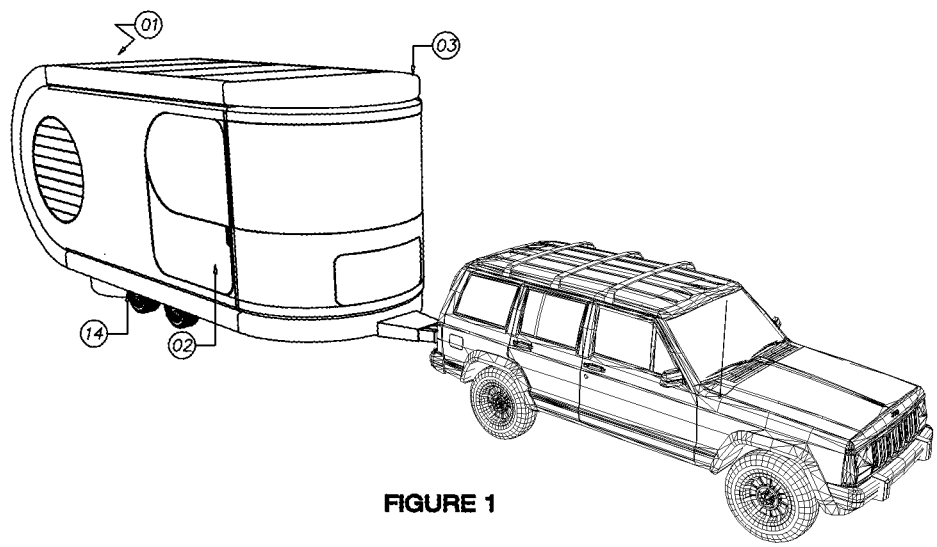
FIG. 1 illustrates a perspective view of a caravan embodiment of the mobile environment in a closed, mobile configuration.
Figure 2:
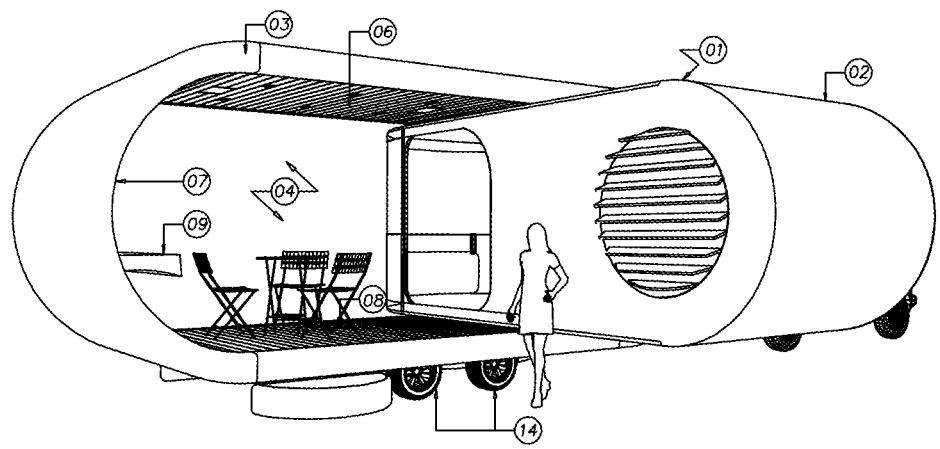
FIG. 2 illustrates a perspective view of a caravan embodiment of the mobile environment in an open living use configuration.
Figure 3:
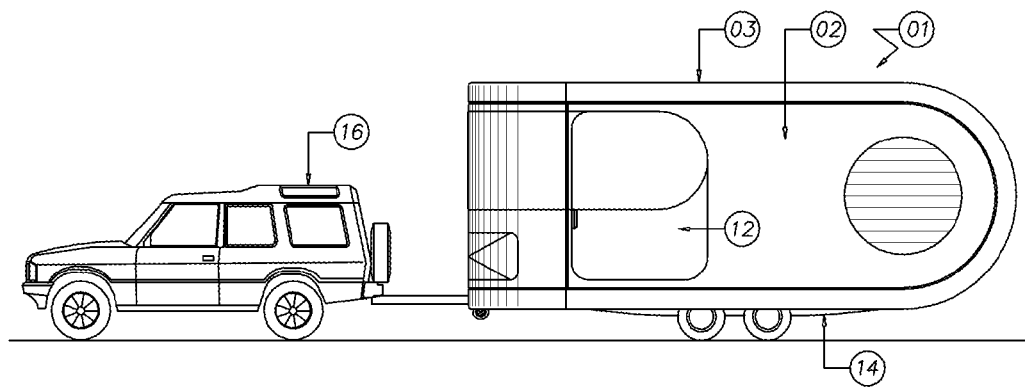
FIG. 3 illustrates a side elevation view of a caravan embodiment in a closed mobile configuration.
Figure 4:
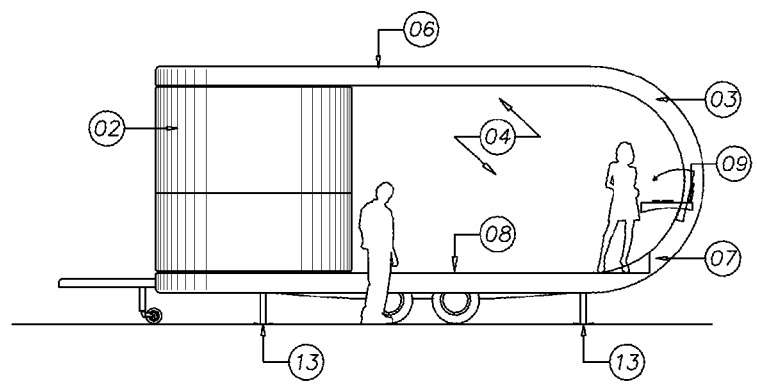
FIG. 4 illustrates a side elevation view of a caravan embodiment of the mobile environment in an open living use configuration.
Figure 5A:
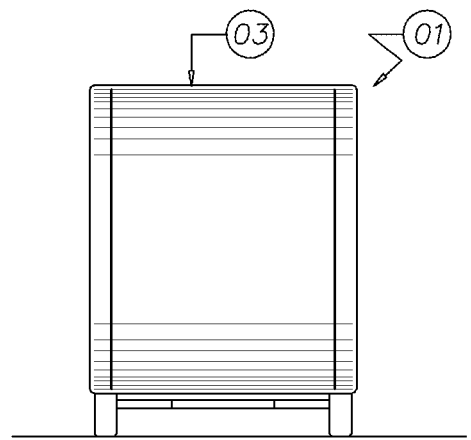
FIG. 5 illustrates a back closed elevation FIG. 5A and back open elevation FIG. 5B of a caravan embodiment.
Figure 5B:
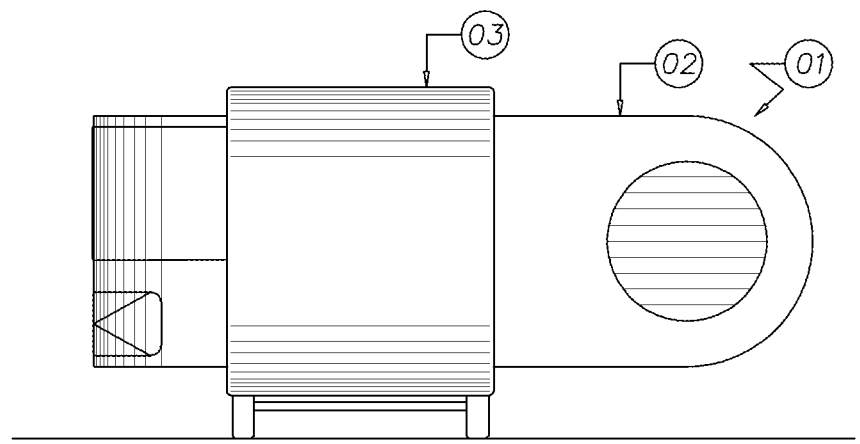
Figure 6A:
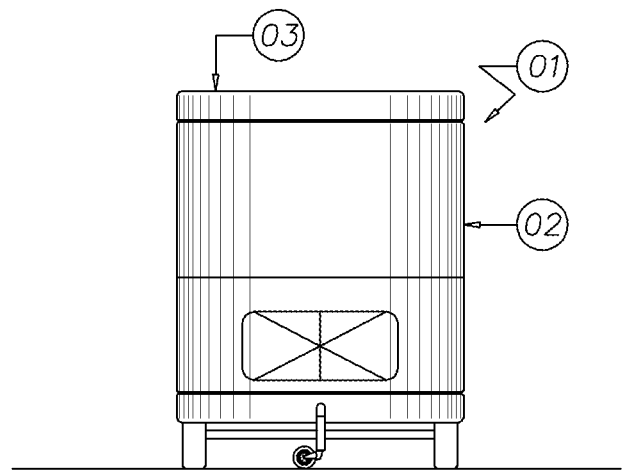
FIG. 6 illustrates a front closed elevation FIG. 6A and front open elevation FIG. 6B of a caravan embodiment.
Figure 6B:
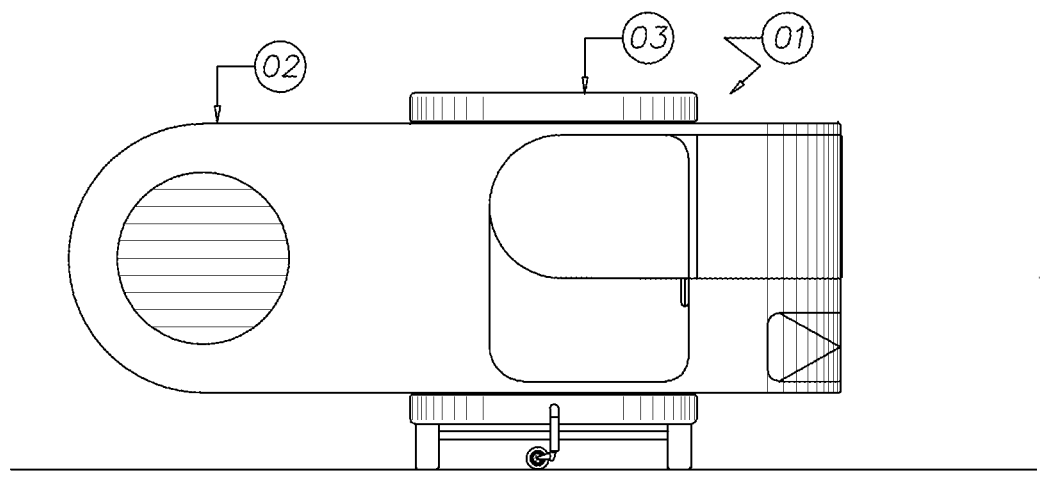

As noted above, the application broadly relates to a modified mobile living environment that incorporates a moulded skin that in transport, matches the enclosed part of the mobile environment and in use slides and rotates away form the enclosed part of the mobile environment to form a deck area.

In a first aspect there is provided a mobile home comprising an internal structure housing the inside living area of the mobile home and an external structure that surrounds at least part of the internal structure and wherein the mobile home has two configurations being:
  (a) a closed configuration wherein the external structure substantially aligns with and encloses at least part of the internal structure; and
  (b) an open configuration wherein the internal structure rotates from the external structure forming an outdoor deck area on the external structure adjacent the internal structure inside living area.

In a second aspect there is provided a mobile home comprising an internal structure housing the inside living area of the mobile home and an external structure that surrounds at least part of the internal structure and wherein the mobile home has two configurations being:
  (a) a closed configuration wherein the external structure substantially aligns with and encloses at least part of the internal structure; and
  (b) an open configuration wherein the external structure rotates from the internal structure forming an outdoor deck area on the external structure adjacent the internal structure inside living area.

As may be appreciated, the closed configuration referred to above may be used when the mobile home is moved such as when it is driven or towed between locations, stored, or if preferred in that configuration when in use.

In the above embodiment, the internal or external structures may rotate about an axis connecting the internal and external structures.

Optionally, the external structure may comprise an overhead portion so that, when in the open configuration the deck area is at least partly covered by the overhead portion. It should be appreciated that having a degree of shelter in the deck area may be advantageous e.g. from sun and rain.

The external structure may comprise a floor portion and an overhead portion that link together to form at least one external wall to the deck area when in the open configuration. The external wall may be opposite the interior living area and at the termination of the external structure thereby partly enclosing the deck area.

Optionally, a cooking area may be integrated into the external wall or walls. The cooking area may comprise a bench top that folds into the external structure wall when not in use or in a closed configuration and folds down for use when in the open configuration. As may be appreciated, a cooking area in the deck portion assists to keep cooking fumes and hazards outside/away from the main internal living area.

The external structure shape may substantially align with the internal structure shape when in the closed configuration. In one embodiment, the exterior of the mobile environment when in at least the closed configuration may be smooth and aerodynamic and maintains a forward profile consistent with the profile of existing mobile home vehicles. In one embodiment, the internal and external structures may be formed from interlocking U-shaped sections.

While other degrees of rotation may be used, in one embodiment the internal or external structure rotates through approximately 90 degrees (in either direction) when moved from a closed to an open configuration. In this embodiment, the internal or external structure once rotated may rest approximately perpendicular to the opposing external or internal structure when in the open configuration.

As may be appreciated, the connection between the two structures is important to consider in the design. One design issue may be that the apparatus used to move the internal or external structure between the closed and open configurations does not penetrate into the interior structure living space. Another design issue may be that the apparatus used to move the internal or external structure between closed and open configurations maintains a rigid connection between both structures to ensure stability of the mobile home in both the open configuration and the closed configuration. Design for water tightness may also be a careful consideration at the interface between the two structures. Also advantageous may be to integrate connection of services such as a gas and/or power connection between the two parts. As should be appreciated, careful design is required to allow for the relative movements of the parts In one embodiment, to move the internal or external structure from a closed to an open configuration, the external structure may be initially moved so as to extend out from the mobile home in a linear translation before then being rotated to an open configuration. Linear translation may move the axis of rotation in a linear translation as well. While not essential, linear translation is preferable, particularly if a snug alignment is to be achieved between the external and internal structures when in the closed configuration.

By way of example, the internal or external structure may move away from the opposing structure performing the linear translation via apparatus selected from the group consisting of: a hydraulic ram or rams, a horizontal actuator or actuators, a powered wheel mechanism or mechanisms, and combinations of these apparatus.

Further, the internal or external structure may rotate from the internal structure via a bearing mechanism. The bearing mechanism may be a yaw or slewing bearing. These types of bearing are helpful as they are able to allow for out-of-balance loads such as when the external structure reaches maximum rotation away from the internal structure and the load on the axis point reaches a maximum.

As noted above, the term 'mobile home' is used to incorporate many mobile living environments both towed and self propelled. In one embodiment, the mobile home may be towed by another vehicle and may be a caravan. In an alternative embodiment, the mobile home may be a self-propelled recreational vehicle.

As should be appreciated, the mobile home may be used for a wide variety of purposes including as a living space but also for other uses including but not limited to, a horse float, business use as a site office or a mobile shop.

In the open configuration, the deck area may be accessible off the enclosed part of the mobile home through a door or doors.

In a further embodiment, the mobile home may include at least one levelling strut. The strut or struts may extend from the external structure, the internal structure or from both structures. Levelling struts may be used to remove load off the wheels/ suspension and also be used to eliminate rocking and level the mobile home.

Optionally, the external structure may include at least one screen that may be used to shelter the deck area when in the open configuration. Optionally, the screens may be made from fabric such as traditional awning materials.

In one embodiment, the mobile home external and internal structures may be formed from a series of sections that may be flat packed during shipping and transport. For example, the external and internal structures may be formed from U-shaped sections as noted above and, for shipping, the sections may be split into mating J-shaped pieces and flat packed.

An advantage of the increased roof area obtained in the open configuration is that the roof area, if fitted with solar panels, provides a much greater collecting surface than traditional mobile homes provide.

As should be appreciated from the above description, the interaction between inside and outside of the mobile home described differs considerably when compared to other mobile homes and caravans. The mobile home described provides the option of a fixed structure deck area that may be quickly set up and broken down. By integrating a cooking area in the external structure, the internal structure has additional space compared to existing designs.

Working Example

A caravan embodiment is now described with reference to FIGS. 1-8. It should be noted that while a caravan is described, the design may be applied to other mobile environments including but not limited to mobile homes and recreational vehicles (RV's).

The mobile home generally indicated by arrow 1 comprises an internal structure 2 housing the inside living area of the mobile home 1 and an external structure 3 that surrounds the internal structure 2.

The mobile home has two configurations.

The closed configuration is shown in FIGS. 1, 3, 5A, 6A and FIGS. 7 and 8 in part. In the closed configuration, the external structure 3 aligns with and encloses the internal structure 2.

The open configuration is shown in FIGS. 2, 4, 5B, 6B and FIGS. 7 and 8 in part. In the open configuration, the external structure 3 is rotated from the internal structure 2 forming an outdoor deck area generally indicated by arrow 4 on the external structure 3 adjacent the internal structure 2 inside living area.

As should be appreciated, the two configurations allow for transport (the closed configuration) and living space use (the open configuration). In the Figures, the mobile home 1 may be towed by another vehicle 16.

The external and internal structures 2,3 rotate about an axis 5 connecting the internal and external structures 2,3. In the embodiment shown, the internal structure 2 rotates out from the external structure 3. The opposite may also be possible with the external structure 3 rotating out from the internal structure 2.

In the embodiment shown, the mobile home 1 external structure 3 includes a roof 6 so that, when in the open configuration, the deck area 4 is covered by the roof 6. The embodiment shown in the Figures also includes an external linking wall 7 that links the deck floor 8 and roof 6, altogether forming the external structure 3. The external wall 7 is located opposite the internal structure 2 living area and at the termination of the external structure 3 thereby partly enclosing the deck area 4. While the Figures illustrate the presence of a roof 8 and wall 7 as well as a floor 8, the external structure 3 may only include a floor 8 or may only include a floor 8 and roof 6 without departing from the scope of the invention.

Optionally, a cooking area 9 may be integrated into the external wall or walls 7. The cooking area 9 shown in the Figures is a bench top with gas hobs that folds into the external structure 3 wall 7 when not in use or in a closed configuration and folds down for use when in the open configuration. A cooking area 9 outside the interior living space assists to keep cooking fumes and hazards outside/away from the main internal living area.

As can be seen from the Figures, the shape of the external structure 3 aligns with the internal structure 2 shape when in the closed configuration. An aim of the exterior design is to provide not only an aesthetically pleasing look but also a smooth and aerodynamic shaped forward profile to minimise drag when the mobile home is transported. The Figures illustrate a design using interlocking U-shaped sections to form the internal and external structures 2,3.

As shown in the Figures, in open configuration, the external structure 3 lies approximately perpendicular to the internal structure 2 when in the open configuration. An angle intermediate 0-90 degrees is possible but approximately perpendicular is preferred in order to maximise space.

Figure 7:
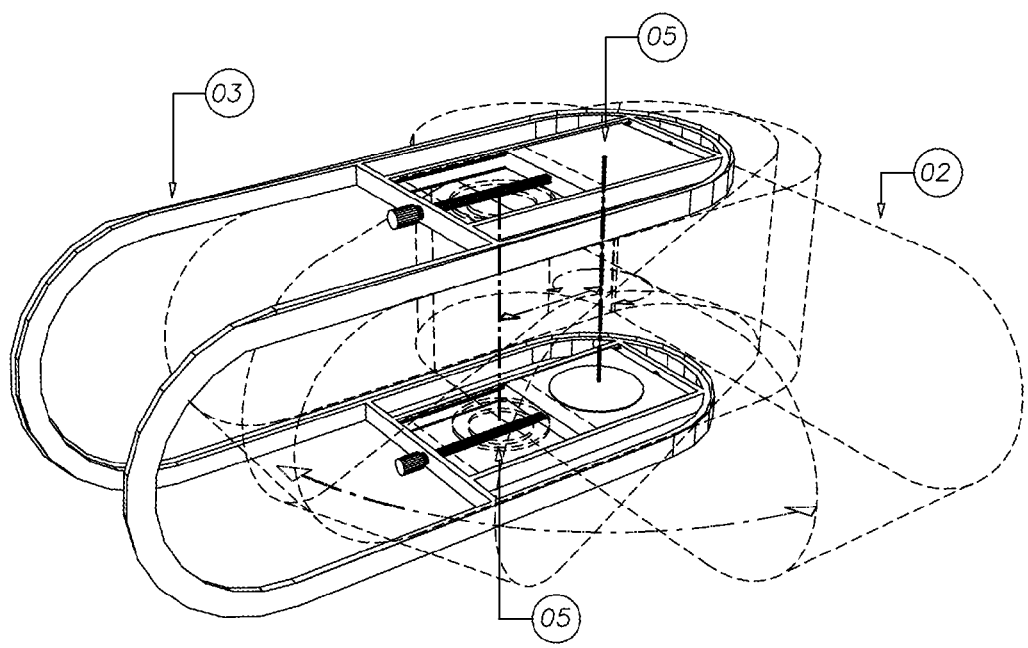
FIG. 7 illustrates a perspective sketch of the caravan exterior and interior sections modeled in a closed, part open and open configuration.
Figure 8:
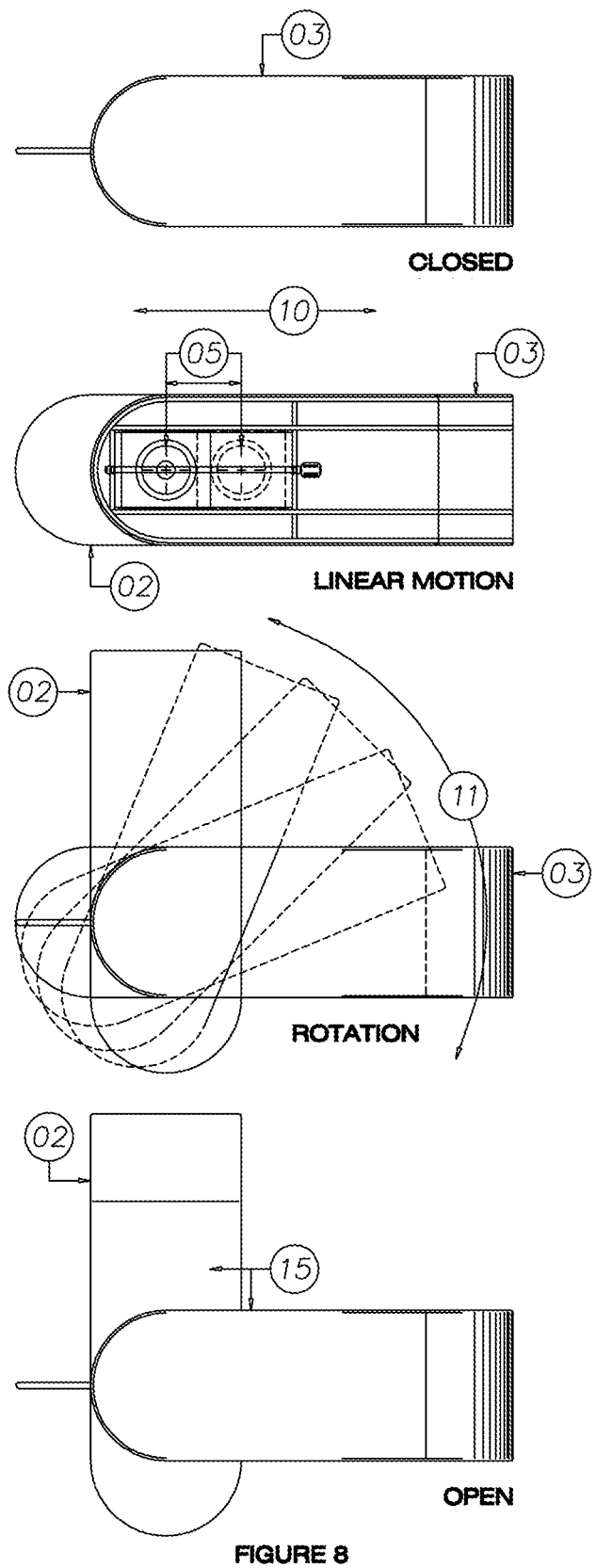
FIG. 8 illustrates the caravan embodiment from a plan view with the caravan exterior being moved from a closed to an open configuration.

As shown in FIGS. 7 and 8, to move the external structure from a closed to an open configuration, the external structure 3 is initially moved so as to extend out from the mobile home in a linear translation 10 before then being rotated 11 to an open configuration. Linear translation moves the axis of rotation 5 in a linear translation as well. Linear translation in the design illustrated is preferable to achieve a snug alignment between the external and internal structures 2,3 when in the closed configuration.

The linear translation may be achieved using a hydraulic ram or rams, a horizontal actuator or actuators, a powered wheel mechanism or mechanisms, and combinations of these apparatus (not shown). Rotation may occur via a bearing mechanism such as a yaw or slewing bearing (not shown). These types of bearing are helpful as they are able to allow for out-of-balance loads such as when the external structure reaches maximum rotation away from the internal structure 2 and the load on the axis point 5 reaches a maximum.

In the open configuration, the deck area 4 may be accessible off the enclosed part of the mobile home 1 through a door or doors 12.

The mobile home may include at least one levelling strut 13 that extends from the external structure 3, the internal structure 2 or from both structures 2,3. Levelling struts are used to remove load off the wheels/suspension 14 and also be used to eliminate rocking and level the mobile home 1.

The external structure 3 may include at least one screen (not shown) on the open sides of the deck area 4 that may be used to shelter the deck area 4 when in the open configuration.

Figure 9:
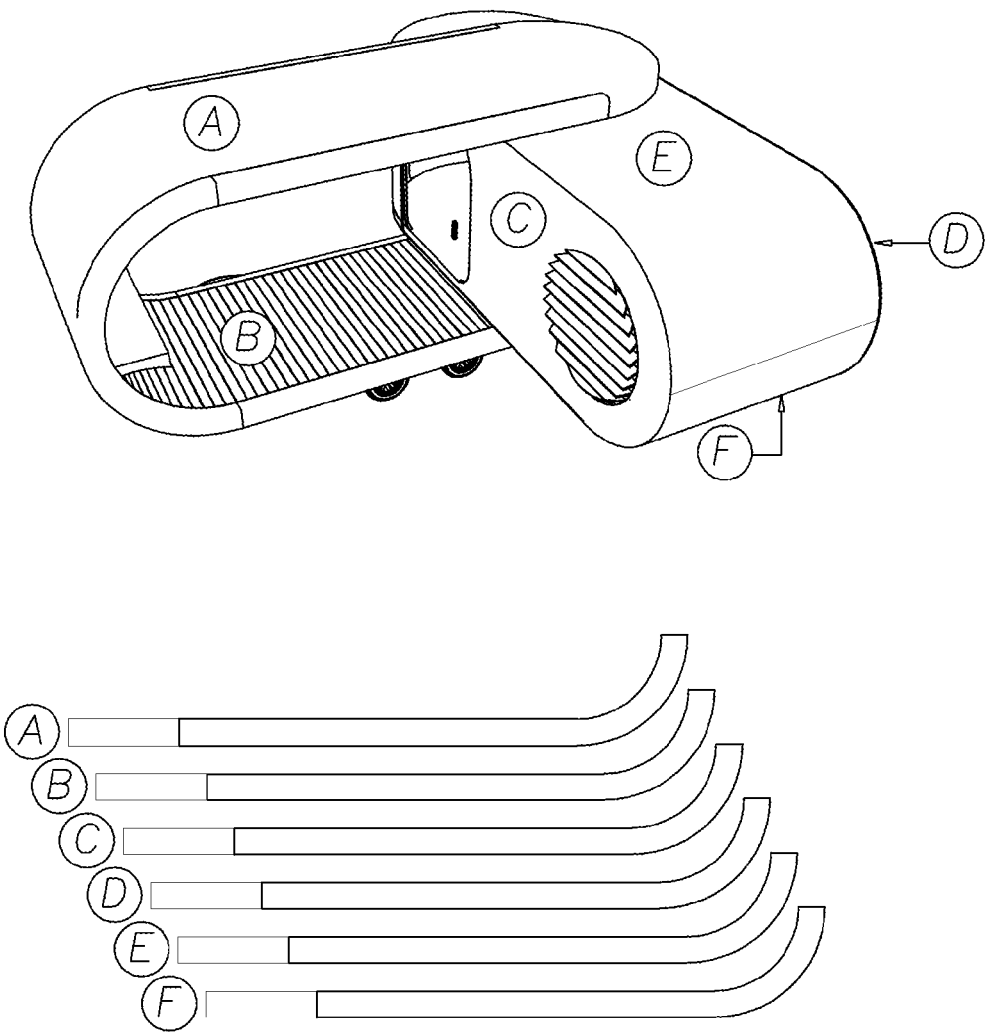
FIG. 9 illustrates a particular design that may be used to flat pack and ship the mobile home.

As shown in FIG. 9, the mobile home 1 external and internal structures 2,3 may be formed from a series of sections marked A-F that may be flat packed during shipping and transport.

An advantage of the increased roof area 15 obtained in the open configuration is that the roof area, if fitted with solar panels, provides a much greater collecting surface than traditional mobile homes provide.

As should be appreciated from the above description, the interaction between inside and outside of the invention design differs considerably when compared to other mobile homes and caravans.

Aspects of the mobile home have been described by way of example only and it should be appreciated that modifications and additions may be made thereto without departing from the scope of the claims herein.

What is claimed is:

1. A mobile home, comprising:
   an internal structure housing an inside living area of the mobile home, and
   an external structure that surrounds at least one surface of the internal structure,
   wherein the mobile home is capable of forming two configurations:
   (a) a closed configuration in which the external structure substantially aligns with and encloses at least one surface of the internal structure;
   (b) an open configuration formed by rotating the internal structure about an axis of rotation relative to the external structure, thereby forming an outdoor deck area on the external structure adjacent the internal structure housing the inside living area; and
   wherein the axis of rotation is movable in a linear translational direction along the length of the mobile home.

2. The mobile home as claimed in claim 1, wherein the mobile home is movable when in the closed configuration.

3. The mobile home as claimed in claim 1 or claim 2, wherein the the axis of rotation connects the internal and external structures.

4. The mobile home as claimed in claim 1, wherein the external structure comprises an overhead portion configured such that when the mobile home is in the open configuration, the deck area of the external structure is at least partly covered by the overhead portion of the external structure.

5. The mobile home as claimed in claim 1, wherein the external structure comprises a floor portion and an overhead portion that are linked together to form at least one wall, the at least one wall forming at least one external wall of the deck area when the mobile home is in the open configuration.

6. The mobile home as claimed in claim 5, wherein a cooking area is integrated into the at least one external wall.

7. The mobile home as claimed in claim 6, wherein the cooking area comprises a bench top that is foldable into the at least one external wall.

8. The mobile home as claimed in claim 1, wherein a shape of the external structure substantially aligns with a shape of the internal structure when the mobile home is in the closed configuration.

9. The mobile home as claimed in claim 1, wherein the internal and external structures are each formed from interlocking U-shaped sections.

10. The mobile home as claimed in claim 1, wherein the internal structure is rotatable through approximately 90 degrees in either direction, relative to the external structure, when moved from the closed configuration to the open configuration.

11. The mobile home as claimed in claim 10, wherein the internal structure is approximately perpendicular to the external structure when the mobile home is in the open configuration.

12. The mobile home as claimed in claim 1, wherein an apparatus which moves the mobile home between the closed and open configurations does not penetrate into the inside living area of the internal structure.

13. The mobile home as claimed in claim 1, wherein an apparatus which moves the mobile home between the closed and open configurations maintains a rigid connection between the internal structure and the external structure, to ensure stability of the mobile home in both the open configuration and the closed configuration.

14. The mobile home as claimed in claim 1, wherein, to move the mobile home from the closed configuration to the open configuration, the internal structure is initially movable so as to extend out from the external structure in the linear translation direction before being rotated to the open configuration.

15. The mobile home as claimed in claim 14, wherein movement in the linear translation direction is performed by an apparatus selected from the group consisting of: at least one a hydraulic ram, at least one a horizontal actuator, at least one a powered wheel mechanism, and combinations of these apparatuses.

16. The mobile home as claimed in claim 1, wherein the internal structure is rotatable relative to the external structure via a bearing mechanism.

17. The mobile home as claimed in claim 16, wherein the bearing mechanism is a yaw or slewing bearing.

18. The mobile home as claimed in claim 1, wherein the mobile home is towable by another vehicle.

19. The mobile home as claimed in claim 1, wherein the mobile home is a caravan.

20. The mobile home as claimed claim 1, wherein the mobile home is self propelled via propelling means located on the external structure.

21. The mobile home as claimed in claim 20, wherein the mobile home is a recreational vehicle.

22. The mobile home as claimed in claim 1, wherein the mobile home includes at least one levelling strut.

23. The mobile home as claimed in claim 22, wherein the at least one levelling strut extends from the external structure, the internal structure or both structures.

24. The mobile home as claimed in claim 1, wherein the external structure includes at least one screen for sheltering the outdoor deck area when in the open configuration.

25. The mobile home as claimed in claim 1, wherein the external and internal structures are each formed from a plurality of sections which are each capable of being flat packed during shipping and transport.

26. The mobile home as claimed in claim 1, wherein a connection between the internal and external structures is watertight.

27. The mobile home as claimed in claim 1, wherein a connection between the internal and external structures links services between the internal and external structures.

28. A mobile home, comprising:
   an internal structure housing an inside living area of the mobile home, and
   an external structure that surrounds at least one surface of the internal structure,
   wherein the mobile home is capable of forming two configurations:
   (a) a closed configuration in which the external structure substantially aligns with and encloses at least one surface of the internal structure; and
   (b) an open configuration formed by rotating the internal structure about an axis of rotation relative to the external structure, thereby forming an outdoor deck area on the external structure adjacent the internal structure housing the inside living area; and
   wherein, to move the mobile home from the closed configuration to the open configuration, the internal structure is initially movable so as to extend out from the external structure in a linear translation direction before being rotated to the open configuration.

29. A mobile home, comprising:
   an internal structure housing an inside living area of the mobile home, and
   an external structure that surrounds at least one surface of the internal structure, wherein the mobile home is capable of forming two configurations:
(a) a closed configuration in which the external structure substantially aligns with and encloses at least one surface of the internal structure; and
(b) an open configuration formed by rotating the internal structure about an off centre axis of rotation, in a horizontal plane, relative to the external structure, thereby forming an outdoor deck area on the external structure adjacent the internal structure housing the inside living area; and wherein, to move the mobile home from the closed configuration to the open configuration, the internal structure is initially movable so as to extend out from the external structure in a linear translation direction before being rotated to the open configuration.

30. The mobile home as claimed in claim 29, wherein the internal and external structures are each formed from interlocking U-shaped sections.

* * * * *